(12) United States Patent  
Tachibana et al.

(10) Patent No.: US 7,730,764 B2  
(45) Date of Patent: Jun. 8, 2010

(54) DROP DETECTION DEVICE AND PORTABLE APPARATUS EQUIPPED THEREWITH

(75) Inventors: Eiichi Tachibana, Ehime (JP); Shinya Mukai, Ehime (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/370,223

(22) Filed: Feb. 12, 2009

(65) Prior Publication Data

US 2009/0205406 A1    Aug. 20, 2009

(30) Foreign Application Priority Data

Feb. 15, 2008    (JP) .............................. 2008-034557

(51) Int. Cl.  
*G01N 3/00* (2006.01)

(52) U.S. Cl. ..................................... 73/12.06

(58) Field of Classification Search ................ 73/12.06, 73/12.07, 12.13

See application file for complete search history.

(56) References Cited

U.S. PATENT DOCUMENTS 7,275,412 B2 *  10/2007  Nishihara et al. .......... 73/12.06

FOREIGN PATENT DOCUMENTS

| JP | 3441668 | 6/2003 |
|---|---|---|
| JP | 2007-109355 | 4/2007 |

* cited by examiner

*Primary Examiner*—Jewel Thompson  
(74) *Attorney, Agent, or Firm*—Wenderoth, Lind & Ponack, L.L.P.

(57) ABSTRACT

There is provided a drop detection device with which a falling state is properly detected even when the device is dropped while itself rotating, for example, and the mistaken detection of a falling state when there is in fact no falling state can be prevented, as well as an portable apparatus equipped with this drop detection device. The portable magnetic disk apparatus comprises an acceleration detector configured to detect acceleration, a calculator configured to calculate acceleration information including a second-order differential value of the acceleration with respect to time detected by the acceleration detector, a threshold setting component configured to set an acceleration threshold ATH with respect to the acceleration for determining whether or not a falling state exists on the basis of the second-order differential value of the acceleration, and a drop detection configured to detect that a falling state exists when the acceleration reaches the acceleration threshold set by the threshold setting component.

20 Claims, 10 Drawing Sheets

DROP DETECTION DEVICE AND PORTABLE APPARATUS EQUIPPED THEREWITH

This application claims priority under 35 U.S.C. §119 to Japanese Patent Application No. 2008-034557 filed on Feb. 15, 2008. The entire disclosure of Japanese Patent Application No. 2008-034557 is hereby incorporated herein by reference.

BACKGROUND OF THE INVENTION

1. Field of the Invention

The present invention relates to a drop detection device that detects its own state when it is being dropped, and to a portable apparatus in which this drop detection device is installed.

2. Description of the Related Art

Portable telephones, digital cameras, and other such portable apparatuses are at a greater risk of being dropped from the user's hand or the place where they have been set during use than are non-portable apparatuses. In particular, with an apparatus equipped with a head and a disk, such as a magnetic recording medium, the impact of falling can cause the head and disk to collide, and this may damage them.

With drop detection devices (mechanisms) used up to now, drop detection was performed by utilizing the fact that the acceleration when a device is in free fall is approximately zero (however, the acceleration in a stationary state is 1 G ($G=9.8$ m/s$^2$). In other words, a fall is detected when the threshold with respect to acceleration is assumed to be approximately zero, and this threshold is reached (or under it) and this state continues for at least a specific length of time. Then specific anti-impact measures are implemented (see Japanese Patent No. 3,441,668 registered on Jun. 20, 2003, for example).

With a configuration such as this, however, when a device falls while rotating, for example, rotational momentum may cause centrifugal force to act on the acceleration sensor built into the device, so that the acceleration ends up not being approximately zero.

Therefore, with a device having this configuration, if the device itself falls while rotating, there is the danger that the fall may not be properly detected. On the other hand, if the threshold with respect to acceleration is set relatively high so that a falling state will be more readily detected in order to solve this problem, then there is the possibility that this device will misinterpret vertical motion of the device produced by action on the part of the user as a falling state.

Also, in order to prevent such a misinterpretation, there is a drop detection mechanism having a constitution in which two thresholds for acceleration are set, and a time during which no drop detection is performed is provided when the acceleration satisfies specific conditions with respect to these thresholds (see Japanese Laid-Open Patent Application 2007-109355 published on Apr. 26, 2007, for example).

However, even with a constitution such as this, in the event that the user drops the device from eye level, for example, there is the possibility that the above-mentioned specific conditions will not be met. Therefore, even with a device constituted as above, there is the danger that the device will be mistakenly assumed to be in a falling state, so it cannot really be said that proper drop detection can be executed.

SUMMARY OF THE INVENTION

It is an object of the present invention to provide a drop detection device that reliably detects a falling state even when the device itself is in a state of falling while rotating for example, and with which mistaken detection of a falling state when a falling state does not in fact exist is prevented, so that highly accurate drop detection can be carried out.

The drop detection device pertaining to the present invention comprises an acceleration detector, a calculator, a threshold setting component, and a drop detector. The acceleration detector is configured to detect movement acceleration. The calculator is configured to calculate acceleration information including an acceleration component of the movement acceleration detected by the acceleration detector, and a second-order differential value of the acceleration component with respect time. The threshold setting component is configured to set an acceleration threshold with respect to the acceleration component for determining whether or not a falling state exists, on the basis of the second-order differential value of the acceleration component. The drop detector is configured to detect that a falling state exists when the acceleration component reaches the acceleration threshold set by the threshold setting component.

Here, the following constitution is employed to reliably detect that a falling state exists and to prevent mistaken detection of a falling state in a drop detection device that detects a falling state when the portable recording device or the like in which the drop detection device is installed is being dropped during its use.

The drop detection device of the present invention comprises a threshold setting component configured to set a threshold (acceleration threshold) for determining whether or not the device is in a falling state, on the basis of the second-order differential value of the acceleration component of movement acceleration of the drop detection device. This drop detection device detects a falling state when the acceleration component reaches the threshold set by the threshold setting component (acceleration threshold).

Here, the acceleration detector may have a triaxial acceleration sensor that can detect the movement acceleration of the acceleration detector itself in each of three mutually intersecting axial directions. Also, the acceleration detector may detect as acceleration only gravitational acceleration (1 G) in a state in which the drop detection device is stationary. In this case, the acceleration is outputted as approximately zero in a state of free fall. The acceleration threshold is the threshold with respect to acceleration, and is used for drop detection.

With this constitution, when this device is falling, the threshold setting component can set the acceleration threshold with respect to the acceleration for detecting a falling state to an acceleration threshold at which drop detection is more likely. This is because, when an object falls from a stationary state, at the start of the fall the second-order differential value of acceleration changes sharply in the negative direction (has a large peak), so the threshold setting component can update the acceleration threshold on the basis of this change. Therefore, the drop detector doubles the acceleration threshold, for instance, so that detection is possible for a rotational fall in which the rotational speed is up to about 1.4 times higher than in a rotational fall that could be detected with a conventional drop detection mechanism.

Specifically, when, as discussed above, an acceleration sensor is used to output an acceleration of approximately zero during a free fall, the acceleration varies sharply from 1 G to 0 G. Therefore, the second-order differential value of the acceleration ends up having at least one large peak in the negative direction. Consequently, the threshold setting component changes the acceleration threshold to a value at which drop detection is more likely. Therefore, the drop detector can detect that a falling state exists even when the device is falling while undergoing rotational motion.

With displacement that is not a fall, such as displacement caused by action on the part of the user, there is none of the sharp change in acceleration that we see in a free fall, and the second-order differential value does not have a large change (peak). Therefore, the threshold setting component will not set the acceleration threshold for determining whether or not the device is in a falling state to an acceleration threshold at which drop detection is more likely, as discussed above. Therefore, if the device moves up or down through movement by the user, the drop detector will be less likely to detect a drop, so mistaken drop detection can be reduced. Accordingly, the drop detector mistakenly detects a drop less often. Consequently, mistaken operation, such as entering into protection operation, does not happen, so the operation of the portable apparatus can be prevented from being hindered.

As a result, even if there is a change in the movement acceleration of the drop detection device due to user actions such as the raising or lowering of the drop detection device (or the apparatus in which it is installed), mistaken detection that a falling state exists will happen less often. Also, accurate drop detection can be performed even when drop detection is complicated by effects such as centrifugal force, as when the device is falling while rotating, for example.

In the drop detection device according to the present invention, the threshold setting component may change the acceleration threshold when the second-order differential value of the acceleration component reaches a specific second-order differential threshold.

The specific second-order differential threshold referred to here is a threshold with respect to the second-order differential value for acceleration, and is used as a reference value for determining whether or not the threshold setting component will change the acceleration threshold. In a case where the acceleration detector outputs an acceleration of approximately zero during free fall, the acceleration threshold after the threshold setting component changes the acceleration threshold is preferably higher than the acceleration threshold prior to the change. More preferably, the acceleration threshold preset by the threshold setting component is from 0 to 0.3 G, and the acceleration threshold after having been changed is from 0.3 to 0.7 G.

Consequently, when the second-order differential value of the acceleration component reaches a specific threshold, the threshold setting component can change the acceleration threshold to a value at which the drop detector is more likely to detect a drop. Therefore, the level at which the acceleration threshold is changed can be clearly determined.

As a result, suitably pre-setting a specific second-order differential threshold for each device makes it possible for the drop detection device to execute stable drop detection.

In the drop detection device according to the present invention, the drop detector may detect a drop when a specific first time has been exceeded in a state in which the acceleration component has reached the acceleration threshold.

The fall of a device is usually assumed to be a situation in which the device is dropped from a person's hand, and if we assume the height to be at least 50 cm, the gravitational acceleration is 9.8 m/s$^2$, and the time it takes for an object to free fall a distance of 50 cm is about 319 ms. Therefore, the specific first time may be about 100 ms, for example.

Consequently, even though the movement acceleration temporarily reaches the acceleration threshold, as long as this state does not continue for the specific first time or longer, the drop detector will not detect a falling state. When the second-order differential value of the acceleration here has reached the above-mentioned second-order differential threshold, since the acceleration threshold has been set to a value at which drop detection is more likely, the time during which the movement acceleration has reached the acceleration threshold tends to be prolonged. However, when the second-order differential value has not reached the second-order differential threshold, the acceleration threshold is set to a value at which a drop is less likely to be detected. Accordingly, the time during which the movement acceleration has reached the acceleration threshold is shorter.

As a result, even if the movement acceleration of the drop detection device temporarily reaches the acceleration threshold due to user actions such as the raising or lowering of the drop detection device (or the apparatus in which it is installed), mistaken detection that a falling state exists can be reliably prevented.

In the drop detection device according to the present invention, after a specific second time from when the acceleration threshold is set on the basis of the second-order differential value, the threshold setting component may set the acceleration threshold back to the acceleration threshold prior to the setting.

Here, for example, the threshold setting component resets the acceleration threshold with respect to the acceleration component for drop detection from a second acceleration threshold to the original first acceleration threshold when a specific second time has elapsed after the change from the first acceleration threshold to the second acceleration threshold.

The above-mentioned specific second time here may be about 200 ms, for example.

In the following description, the acceleration threshold that has been changed by the threshold setting component on the basis of the second-order differential value of the acceleration component will be referred to as the second acceleration threshold, and the acceleration threshold prior to this change will be referred to as the first acceleration threshold.

The result of this is that a second acceleration threshold at which a falling state is more likely to be detected, that is, a second acceleration threshold whose value is closer to 1 G than the first threshold, can be used as the threshold for detecting a drop only during a specific second time after the second-order differential value for acceleration has reached a specific threshold. If the second acceleration threshold remains as set, or if there is no change to the first acceleration threshold until the user performs a specific operation, there is the risk that the acceleration will reach the second acceleration threshold with respect to drop detection even in the case of spatial movement of the device that is not a drop, and that this will lead to erroneous detection of a drop.

Therefore, by limiting the time during which the threshold with respect to acceleration for drop detection is set to the second acceleration threshold, it is possible to reliably detect a drop in the case of a falling state, without detecting a drop in the case of up or down motion, etc., caused by the action of the user.

As a result, even with a constitution in which the drop detection device (or an apparatus in which it is installed) temporarily performs anti-impact processing when a drop has been detected, hindrance of the use of the apparatus can be prevented.

In the drop detection device according to the present invention, the acceleration detector may have a triaxial acceleration sensor that detects the movement acceleration in each of three mutually intersecting axial directions.

Here, a common triaxial acceleration sensor is used as the acceleration detector.

Here, the three mutually intersecting axial directions are preferably three mutually perpendicular axial directions.

The result of this is that no matter in which direction acceleration occurs in the device, this acceleration can be detected as a combination of the output of the acceleration sensor for the three axial directions.

As a result, the calculator can calculate an acceleration component that precisely matches the acceleration component in the free fall direction that actually occurs in the acceleration detector, in any type of free fall state.

A portable apparatus according to the present invention comprises the above mentioned drop detection device, and a protector. The protector implements anti-impact measures when the drop detection device detects a drop.

The anti-impact processing here is processing for cushioning an impact caused by collision with the ground or a floor when the portable apparatus has been dropped, or processing for protecting the precision parts provided to the portable apparatus, for example.

The result of this is that if a portable apparatus that is held in the hand during use, such as a camera or a portable telephone, is accidentally dropped by the user, the portable apparatus can execute processing for protecting itself from impact prior to hitting the ground or floor.

As a result, the amount of damage caused by impact when dropped can be reduced.

The portable device according to the present invention may further comprise a magnetic head for recording to and reproducing from a magnetic recording disk, and a controller for retracting the magnetic head into a retraction region.

Here, with a constitution in which a magnetic disk device is installed in the portable apparatus, the controller retracts the magnetic head into a retraction region when the drop detection device detects a drop in order to prevent the magnetic head and the magnetic disk from collision and damaging each other.

The retraction region referred to here is a protection region in which the magnetic head will not collide with the magnetic disk even when the magnetic head moves drastically or fluctuates due to the impact by a drop.

Consequently, the drop detection device detects a drop and retracts the magnetic head into the retraction region. Therefore, collision between the magnetic head and the magnetic disk can be prevented.

As a result, the magnetic disk or magnetic head itself, as well as the information recorded on the magnetic disk, can be protected, so a portable apparatus with superior impact resistance can be obtained.

With the drop detection device pertaining to the present invention, even if there is a change in the movement acceleration of the drop detection device due to user actions such as the raising or lowering of the apparatus in which the drop detection device is installed, mistaken detection can be prevented. Furthermore, even when drop detection is complicated by effects such as centrifugal force, as when the device is falling while rotating, for example, accurate drop detection will still be possible.

DETAILED DESCRIPTION OF THE INVENTION

A portable magnetic disk apparatus 1 (portable apparatus) pertaining to an embodiment of the present invention will now be described through reference to FIGS. 1 to 9.

Configuration of Portable Magnetic Disk Apparatus 1

Figure 1:
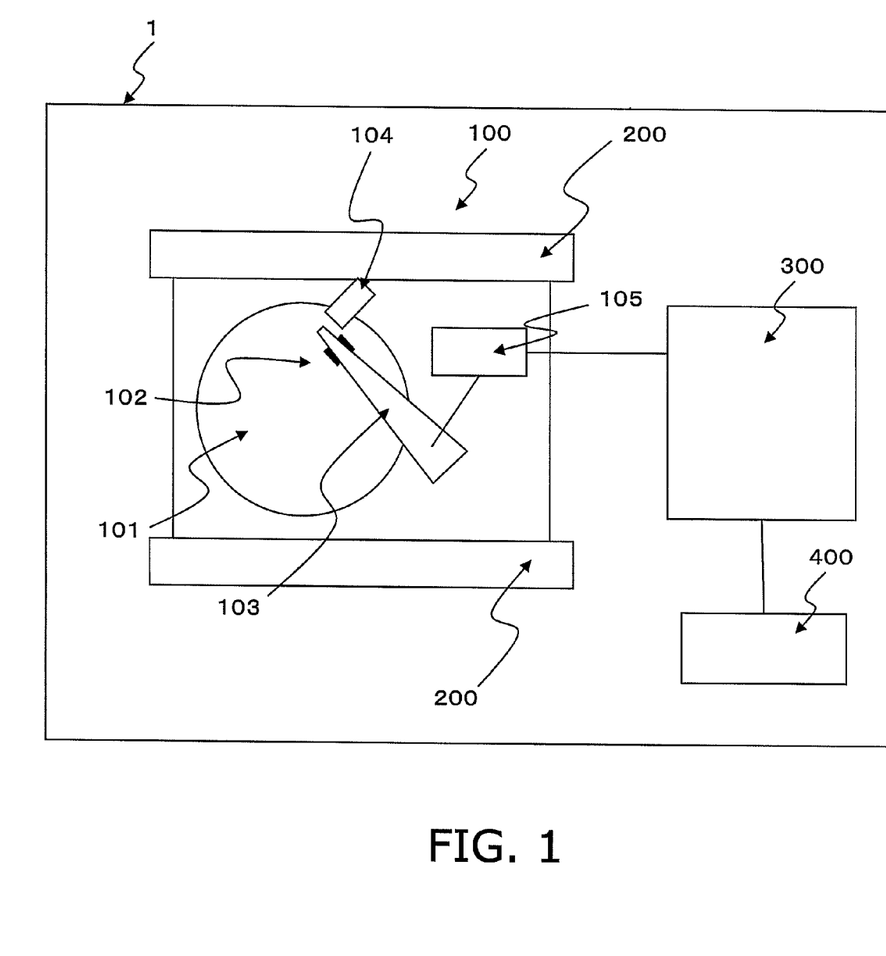
FIG. 1 is a block diagram of the functional configuration of the portable magnetic disk apparatus 1 pertaining to an embodiment of the present invention.

The portable magnetic disk apparatus 1 in this embodiment is a device for recording video, images, or the like to a magnetic disk 101, and as shown in FIG. 1, it mainly comprises a magnetic disk device 100, a cushioning material 200, a drop detection device 300, and a clock signal generator 400.

Magnetic Disk Device 100

As shown in FIG. 1, the magnetic disk device 100 mainly has the magnetic disk 101, a magnetic head 102, a rotor arm 103, a ramp load component (protector) 104, and a controller 105.

The magnetic disk 101 is a disk-shaped information recording medium, and has on one side an information recording layer with which information can be recorded by means of a difference in the magnetic state between adjacent regions.

The magnetic head 102 is a member that is used to read information recorded to the magnetic disk 101, or to record information to the magnetic disk 101.

The rotor arm 103 is a member that supports the magnetic head 102, and is rotatably attached so that the magnetic head 102 can move in the radial direction of the magnetic disk 101.

The ramp load component 104 is provided on the outside in the radial direction with respect to the outer peripheral part of the magnetic disk 101, in order to prevent contact between the magnetic head 102 and the magnetic disk 101.

The controller 105 moves the magnetic head 102 to the ramp load component 104 by rotating the rotor arm 103 upon receiving a drop detection signal from the drop detection device 300, which will be discussed in detail at a later point.

Cushioning Material 200

The cushioning material 200 serves to cushion the falling impact to which the magnetic disk device 100 is subjected when the portable magnetic disk apparatus 1 is dropped, and is attached to the outer edge of the magnetic disk device 100.

The cushioning material 200 is made from a urethane or rubber material with high impact absorbing properties. This allows the cushioning material 200 to protect the magnetic disk device 100 by absorbing and cushioning impacts exerted from the outside.

Drop Detection Device 300

Figure 2:
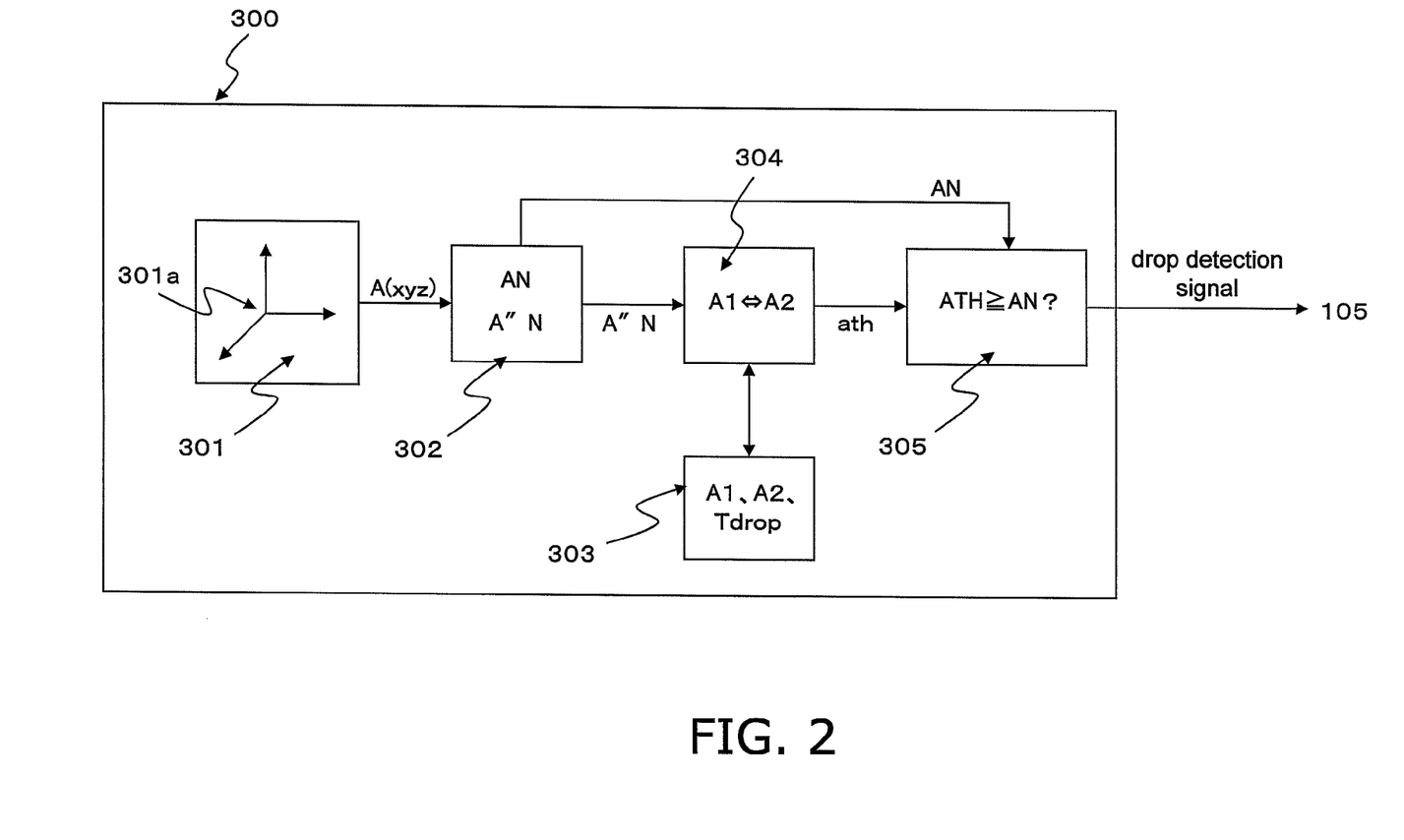
FIG. 2 is a block diagram of the functional configuration of the drop detection device shown in FIG. 1.

The drop detection device 300 detects that the portable magnetic disk apparatus 1 is in a falling state, and outputs a drop detection signal to the controller 105, in order to perform processing to protect the magnetic disk device 100 before it is subjected to an impact from being dropped. As shown in FIG. 2, this drop detection device 300 mainly has an acceleration detector 301, a calculator 302, a threshold value storage component 303, a threshold setting component 304, and a drop detector 305.

The acceleration detector 301 is fixed to the housing of the portable magnetic disk apparatus 1. Also, the acceleration detector 301 has a triaxial acceleration sensor 301a for detecting the acceleration (ax, ay, and az) in each of three mutually perpendicular directions (the X axis, Y axis, and Z axis). The acceleration detector 301 outputs to the calculator 302 the accelerations in three directions detected by the triaxial acceleration sensor 301a.

In this embodiment, a piezo element is used as the triaxial acceleration sensor 301a. A piezo element contains a piezoelectric material, and acceleration in each direction is detected by utilizing a property whereby a change in the amount of deformation of this piezoelectric material brings about a change in the resistance of the material. That is, a larger electrical signal is outputted in proportion to the change in acceleration, which is itself a function of the change in the amount of deformation. In a spatially stationary state (including constant-velocity linear motion), the values for acceleration (ax, ay, and az) indicated by the triaxial acceleration sensor 301a are (0, 0, G) when the Z axis is facing in the vertical downward direction, and an acceleration of 1 G is detected in the vertical downward direction.

Here, the acceleration G is what is known as gravitational acceleration, which is 9.8 M/s$^2$. Meanwhile, in a state in which the triaxial acceleration sensor 301a is free falling, the accelerations in three directions (ax, ay, and az) measured by the triaxial acceleration sensor 301a are (0, 0, 0). That is, in a free fall state, the triaxial acceleration sensor 301a detects that the sum A of the accelerations is approximately zero. In other words, the sum A of accelerations outputted by the triaxial acceleration sensor 301a is expressed by A=g−(bx+by+bz), where the motion acceleration is (bx, by, bz). Here, A, ax, ay, az, bx, by, bz, and g are vectors, and the above-mentioned equation is the result of using vector computation.

The calculator 302 acquires the signal outputted by the acceleration detector 301, at intervals synchronized with the clock frequency (Tclk) used in the portable magnetic disk apparatus 1. The calculator 302 then calculates the absolute value (acceleration component) AN (hereinafter referred to as the acceleration AN) of the first acceleration of the portable magnetic disk apparatus 1, and the second-order differential value A"N of the acceleration AN. That is, the calculator 302 calculates the acceleration AN=(ax$^2$+ay$^2$+az$^2$)$^{1/2}$ and the second-order differential value A"N=AN·d$^2$/dt$^2$, which is obtained from this acceleration AN with respect to time.

The threshold value storage component 303 holds acceleration threshold ATH (A1 and A2 in this embodiment) corresponding to the acceleration AN for determining whether or not the portable magnetic disk apparatus 1 is in a falling state, and a drop time threshold Tdrop (specific first time) for determining whether or not the drop detector 305 outputs a drop detection signal. The threshold value storage component 303 also holds the A2 duration Ta, the second-order differential threshold A"TH that is a threshold with respect to the second-order differential value A"N), and so forth. The acceleration threshold ATH, the drop time threshold Tdrop, and so forth are outputted to the threshold setting component 304.

The threshold setting component 304 sets the threshold used in determining whether or not a falling state exists, chosen from a plurality of acceleration thresholds stored in the threshold value storage component 303, on the basis of the second-order differential A"N for acceleration AN calculated by the calculator 302. In this embodiment, if the second-order differential value A"N for acceleration AN drops below the second-order differential threshold A"TH, the threshold setting component 304 changes the acceleration threshold ATH with respect to the acceleration AN from A1 to A2. If a specific length of time has elapsed since the acceleration threshold ATH has been changed to A2, the threshold setting component 304 performs control such that the acceleration threshold ATH is set back to A1 from A2.

The drop detector 305 compares the acceleration AN calculated by the calculator 302 with the acceleration threshold ATH set by the threshold setting component 304, and determines whether or not the portable magnetic disk apparatus 1 is in a falling state. In this embodiment, the drop detector 305 determines that a falling state exists when the acceleration AN drops under the acceleration threshold ATH. If the duration of the falling state, that is, the duration that the acceleration AN≧the acceleration threshold ATH, stably reaches the drop time threshold Tdrop, a drop detection signal is outputted to the magnetic disk device 100 (the controller 105) to protect the magnetic disk device 100 from impact due to being dropped.

Clock Signal Generator 400

The clock signal generator 400 supplies a clock signal that serves as a reference for determining whether the device is falling and determining the timing at which the acceleration information is acquired by the drop detection device 300.

Drop Detection Processing of the Portable Magnetic Disk Apparatus 1

The drop detection process of the portable magnetic disk apparatus 1 will now be described in detail.

Figure 3:
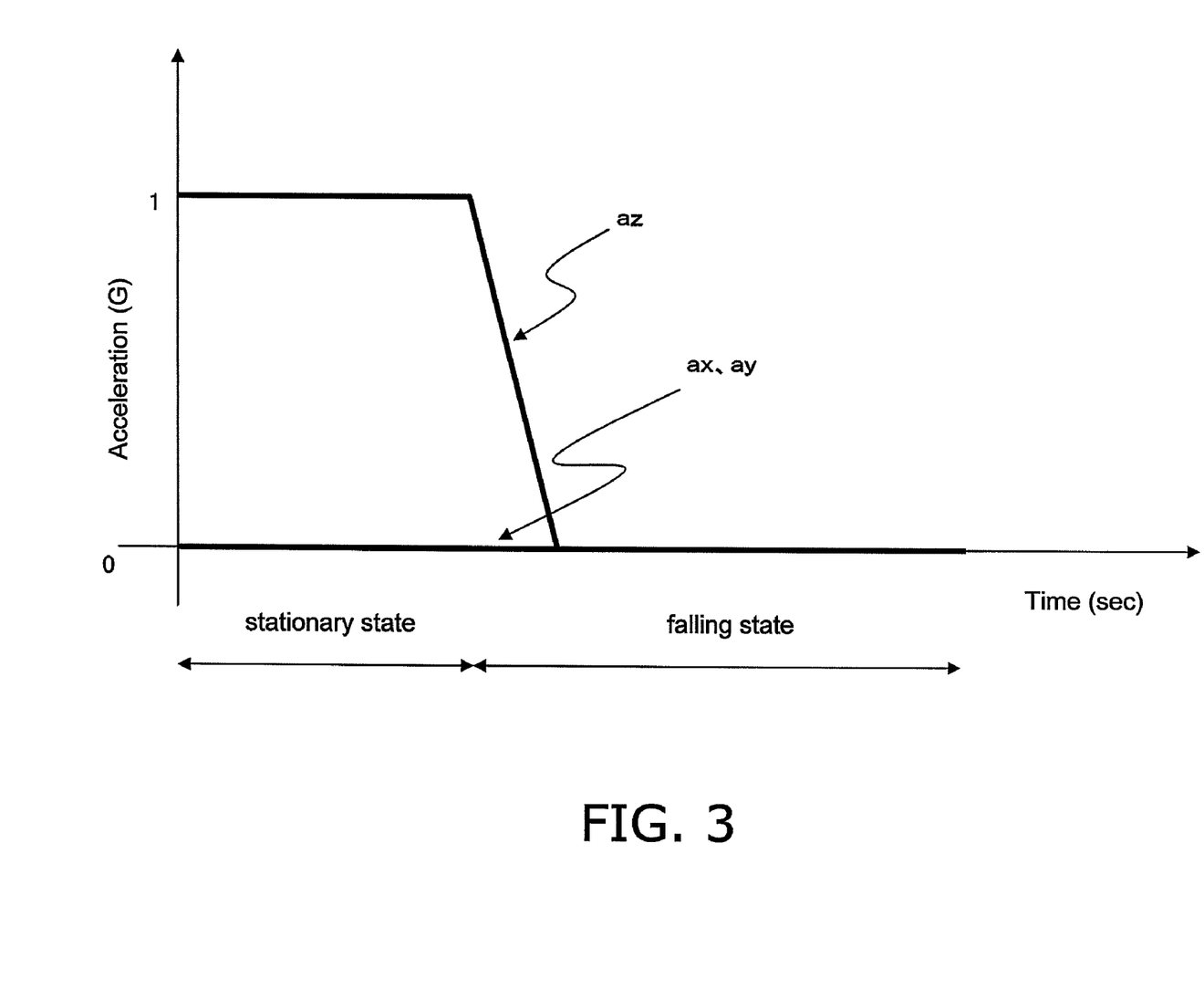
FIG. 3 is an example of the output when the triaxial acceleration sensor shown in FIG. 2 changes from a stationary state to a falling state.

First, the acceleration to which the portable magnetic disk apparatus 1 is subjected is detected by the triaxial acceleration sensor 301a. A signal corresponding to the detected acceleration is then outputted. For example, as shown in FIG. 3, when the portable magnetic disk apparatus 1 is in a stationary state and the Z axis is facing in the vertical downward direction, the triaxial acceleration sensor 301a detects a gravitational acceleration of 1 G, and the outputted acceleration component signals are ax=ay=0 and az=1 G. When the portable magnetic disk apparatus 1 changes from this state to a state of free fall that is no gravity, the acceleration signal az for the Z axis changes from 1 G to 0 G.

The calculator 302 then acquires the acceleration signals (ax, ay, and az) outputted by the triaxial acceleration sensor 301a, at intervals synchronized with the clock frequency (Tclk) produced in the portable magnetic disk apparatus 1, and calculates the acceleration AN=(ax$^2$+ay$^2$+az$^2$)$^{1/2}$ and the second-order differential value A"N=AN·d$^2$/dt$^2$.

Also, the threshold value storage component 303 stores the acceleration threshold ATH, which holds the thresholds A1 and A2, with respect to the acceleration AN set by the threshold setting component 304.

The processing performed by the threshold setting component 304 will now be described in detail through reference to FIG. 4.

First, in step S10, the threshold setting component 304 detects that the power is on to the portable magnetic disk apparatus 1, and the flow proceeds to step S11.

In step S11, the threshold setting component 304 sets the acceleration threshold ATH to A1.

In step S12, the threshold setting component 304 determines whether or not the second-order differential value A"N is below the second-order differential threshold A"TH. If the threshold setting component 304 determines that the second-order differential value A"N is not below the second-order differential threshold A"TH, step S11 is repeated. On the other hand, if the threshold setting component 304 determines that the second-order differential threshold A"N is below A"TH, the flow proceeds to step S13.

In step S13, the threshold setting component 304 changes the acceleration threshold ATH form A1 to A2.

In steps S14 and S15, the threshold setting component 304 keeps track of how long the acceleration threshold ATH is at A2. More specifically, the calculator 302 uses the clock frequency Tclk of the portable magnetic disk apparatus 1. That is, this loop computation (steps S14 and S15) is repeated until the time T(n)=t(n−1)+Tclk (where n=1, 2, . . . ) during which the acceleration threshold ATH is set at A2 is at or above the A2 duration Ta (the specific second time). Once the time T(n) reaches the A2 duration Ta, the flow proceeds to step S16.

In step S16, the threshold setting component 304 resets the acceleration threshold ATH from A2 back to A1.

In step S17, the threshold setting component 304 resets the time T(n) to zero in preparation for when the acceleration threshold ATH is changed from A1 to A2.

In step S18, it is determined whether to end the operation or return to step S12 based on whether or not the power to the portable magnetic disk apparatus 1 is off. That is, as long as the power is not being off, the threshold setting component 304 repeats the processing from step S12 to step S17.

The processing performed by the drop detector 305 will now be described in detail through reference to FIG. 5.

First, in step S100, it is detected that the power is on to the portable magnetic disk apparatus 1, and the flow proceeds to step S101.

In step S101, the drop detector 305 determines whether or not the acceleration threshold ATH set by the threshold setting component 304 is at A1. If the drop detector 305 here determines that ATH=A1, the flow proceeds to step S102. On the other hand, if the drop detector 305 determines that acceleration threshold ATH≠A1, the flow proceeds to step S108.

In step S102, the drop detector 305 determines whether or not the acceleration AN is at or below A1. If the drop detector 305 here determines that the acceleration AN≦A1, the flow proceeds to step S104. On the other hand, if the drop detector 305 determines that the acceleration AN>A1, the flow proceeds to step S103.

In step S103, the drop detector 305 determines whether to end the operation or return to step S101 based on whether or not the power to the portable magnetic disk apparatus 1 is off. That is, as long as the power not being off, the drop detector 305 repeats the processing from step S101 to step S112, which will be described below.

In steps S104 and S105, the drop detector 305 uses the clock frequency Tclk of the portable magnetic disk apparatus 1 to keep track of the time T(m) during which the acceleration AN is under the acceleration threshold ATH that is at A1 here. That is, the drop detector 305 repeats steps S102, S104, and S105 until the time T(m)=T(m−1)+Tclk (where m=1, 2, . . . ) during which the acceleration AN is under A1 exceeds the drop time threshold Tdrop, or until the acceleration AN goes over A1. In step S105, if the drop detector 305 has determined that the time T(m) during which the acceleration AN≦A1 is over the drop time threshold Tdrop, then it is determined that the portable magnetic disk apparatus 1 is in a falling state, and the flow proceeds to step S106.

In step S106, the drop detector 305 outputs a drop detection signal to the magnetic disk device 100 (the controller 105).

In step S107, the drop detector 305 resets the time T(m) to zero in preparation for when the acceleration AN drops back under the acceleration threshold ATH that is A1 here.

In step S108, the drop detector 305 determines whether or not the acceleration AN≦A2. If the drop detector 305 here determines that the acceleration AN≦A2, the flow proceeds to step S109. On the other hand, if the drop detector 305 determines that the acceleration AN>A2, the flow proceeds to step S103.

In steps S109 and S110, the drop detector 305 uses the clock frequency Tclk of the portable magnetic disk apparatus 1 to keep track of the time T(k) during which the acceleration AN is under the acceleration threshold ATH that is A2 here. That is, the drop detector 305 repeats steps S108, S109, and S110 until the time T(k) during which the acceleration AN is under A2 exceeds the drop time threshold Tdrop, or until the acceleration AN goes over A2. In step S110, if the drop detector 305 has determined that the time T(k) during which the acceleration AN≦A2 is over the drop time threshold Tdrop, then it is determined that the portable magnetic disk apparatus 1 is in a falling state, and the flow proceeds to step S111.

In step S111, the drop detector 305 outputs a drop detection signal to the magnetic disk device 100 (the controller 105).

In step S112, the threshold setting component 304 resets the time T(k) to zero in preparation for when the acceleration AN drops back under the acceleration threshold ATH that is A2 here.

As discussed above, the drop detector 305 compares the acceleration AN calculated by the calculator 302 with the acceleration threshold ATH set by the threshold setting component 304, and if AN≦ATH, it is determined that the portable magnetic disk apparatus 1 is in a falling state. The drop detector 305 outputs a drop detection signal to the magnetic disk device 100 (the controller 105) when the falling state reaches the drop time threshold Tdrop. Upon receipt of the drop detection signal, the magnetic disk device 100 (the controller 105) retracts the magnetic head 102 into the ramp load component 104.

Examples in which the portable magnetic disk apparatus 1 is actually dropped, or in which it moves up and down due to user movement, for instance, will now be described through reference to FIGS. 6 to 10.

Figure 6:
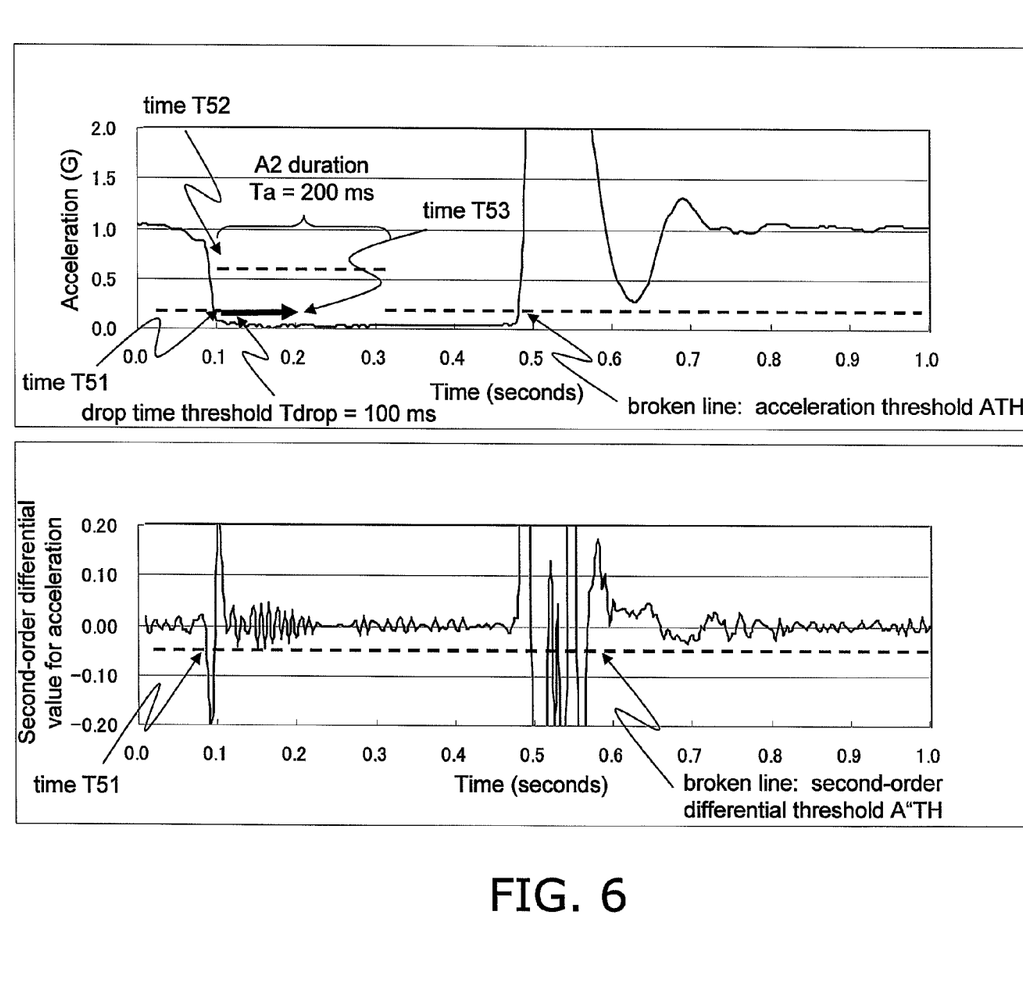
FIG. 6 consists of graphs of the acceleration, the second-order derivative value for acceleration, and the thresholds when the portable magnetic disk apparatus shown in FIG. 1 goes from a stationary state to falling.

First, we will describe a case in which the portable magnetic disk apparatus 1 has been dropped, as shown in FIG. 6. The acceleration AN applied to the triaxial acceleration sensor 301a decreases suddenly and simultaneously with the start of the fall of the portable magnetic disk apparatus 1 at the time T51. Since the second-order differential value A"N has a peak on the negative side and is under the second-order differential threshold A"TH, the threshold setting component 304 changes the acceleration threshold ATH from A1 to A2 for a duration Tth of 200 ms (milliseconds) from the time T51. In this embodiment, since the acceleration AN is under the acceleration threshold ATH that is A2 here at the time T52, the drop detector 305 determines that a falling state exists.

The impact resistance during operation of the small magnetic disk devices 100 produced in recent years is about 500 G. Because of the cushioning effect of the cushioning material 200, when the magnetic disk device 100 withstands a drop from a height of 30 cm, the time it takes for the drop impact to be exerted from the start of the fall is approximately 250 ms. Therefore, when the time it takes for the magnetic head 102 of the magnetic disk device 100 to retract into the ramp load component 104 is taken into account, the drop time threshold Tdrop is set to 100 ms. In this case, the acceleration AN is under the acceleration threshold ATH, and the falling state continues, from the time T52 until the time T53 after the elapse of the drop time threshold Tdrop (100 ms). Therefore, the drop detector 305 outputs a drop detection signal to the magnetic disk device 100 (the controller 105). Consequently, the magnetic disk device 100 (the controller 105) built into the portable magnetic disk apparatus 1 can retract the magnetic head 102 into the ramp load component 104 before the impact hits.

Figure 7:
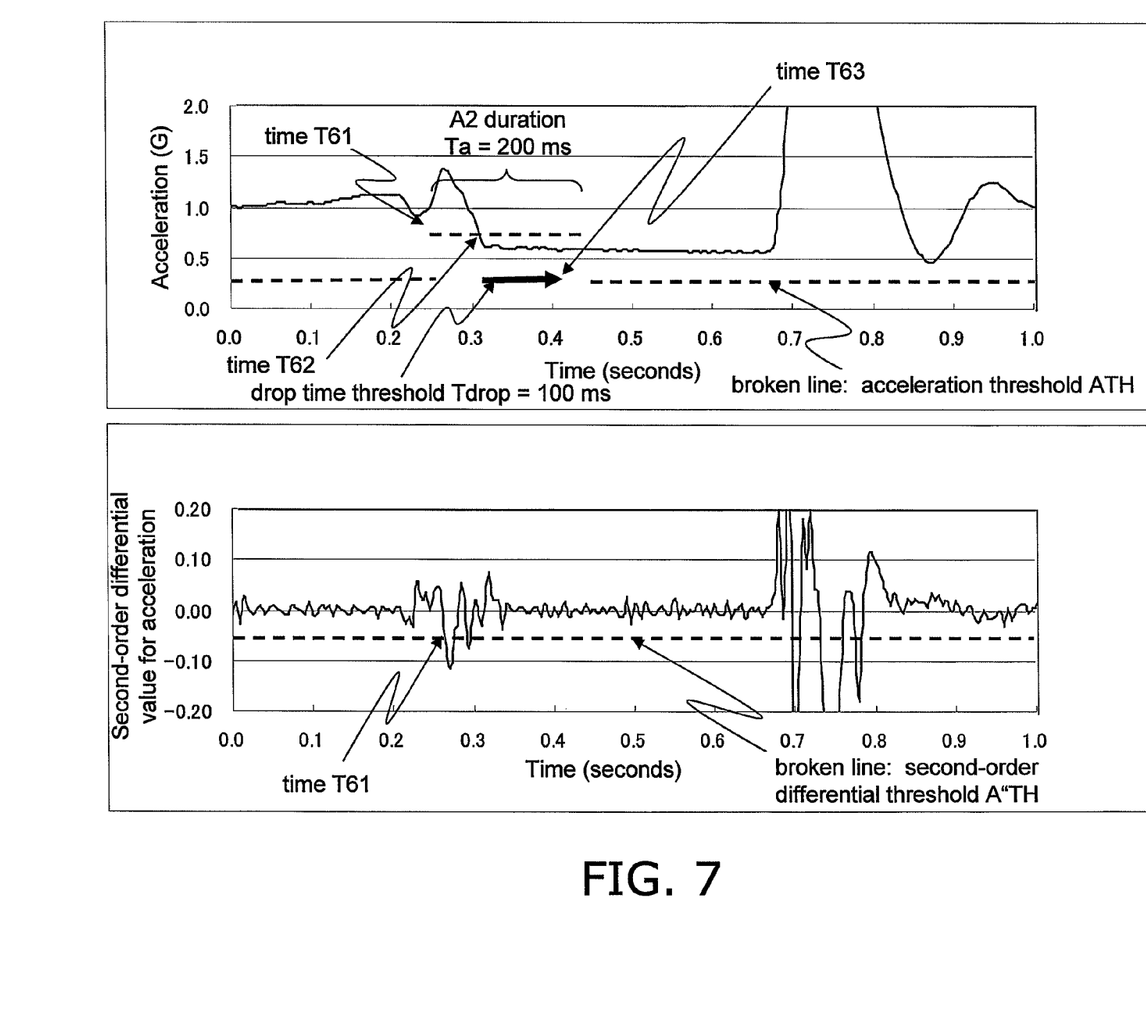
FIG. 7 consists of graphs of the acceleration, the second-order differential value for acceleration, and the thresholds when the portable magnetic disk apparatus shown in FIG. 1 goes from a stationary state to falling while rotating.

Next, the determination of drop detection when the portable magnetic disk apparatus 1 falls while rotating, as shown in FIG. 7, will be described.

Here, the acceleration AN applied to the triaxial acceleration sensor 301a decreases suddenly and simultaneously with the start of the fall of the portable magnetic disk apparatus 1 at the time T61. Also, the second-order differential value A"N has a peak on the negative side and is under the second-order differential threshold A"TH. Therefore, the threshold setting component 304 changes the acceleration threshold ATH from A1 to A2 for a duration Tth of 200 ms from the time T61. When the time T62 has passed, the acceleration AN is under the acceleration threshold ATH that is A2 here, so the drop detector 305 determines that a falling state exists.

The acceleration AN from the time T62 until the time T63 after the elapse of the drop time threshold Tdrop (100 ms) is under the acceleration threshold ATH, and the falling state continues. Therefore, the drop detector 305 outputs a drop detection signal to the magnetic disk device 100 (the controller 105). As a result, the magnetic disk device 100 (the controller 105) can retract the magnetic head 102 into the ramp load component 104.

Figure 8:
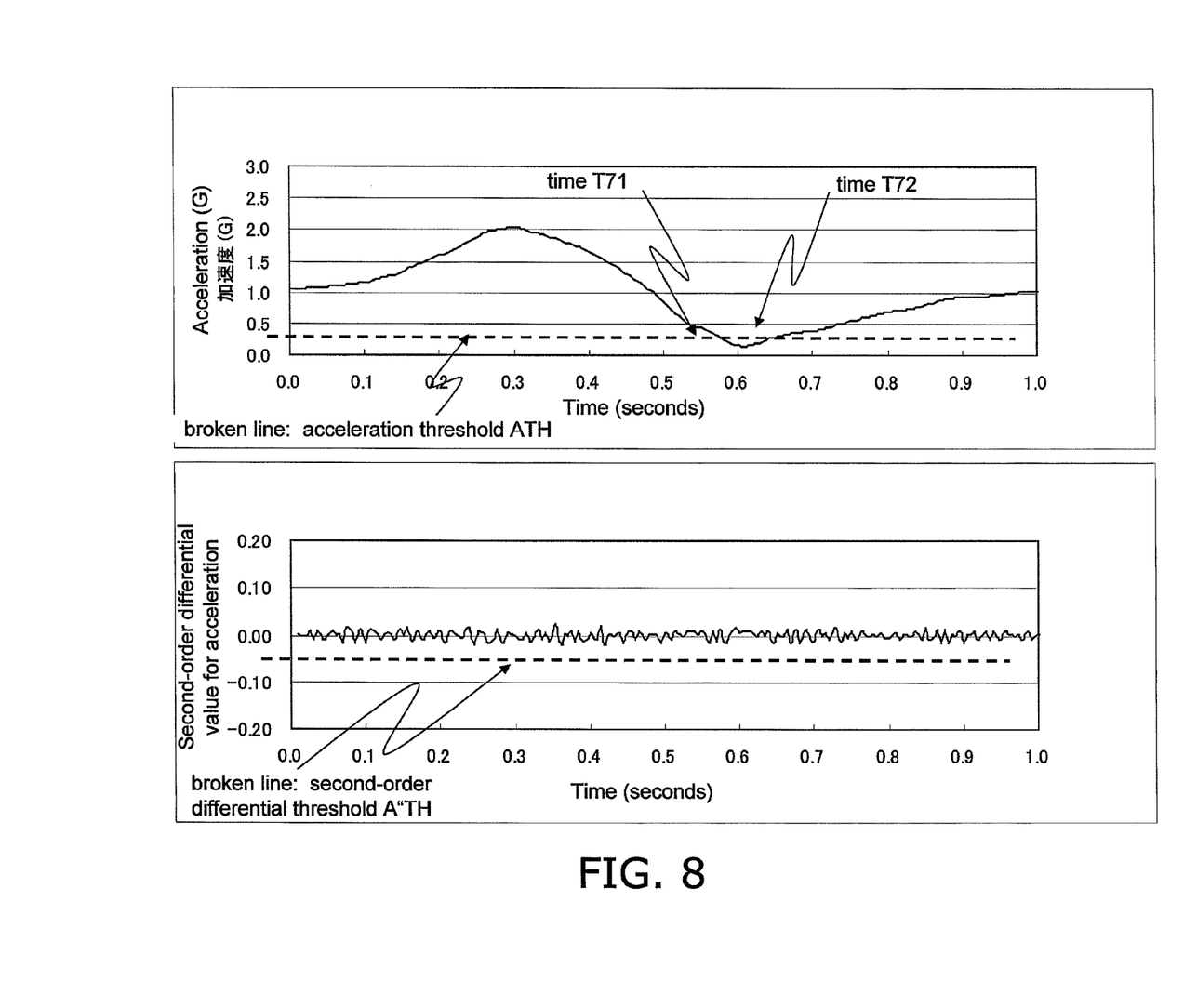
FIG. 8 consists of graphs of the acceleration, the second-order differential value for acceleration, and the thresholds when the user lifts the portable magnetic disk apparatus shown in FIG. 1.

We will now describe the determination of drop detection when the user has lifted the portable magnetic disk apparatus 1, which is not in a falling state, as shown in FIG. 8, Here, the acceleration AN applied to the triaxial acceleration sensor 301a is greater than 1 G because the portable magnetic disk apparatus 1 rises, after which the acceleration AN drops under 1 G when the device comes to rest. However, the second-order differential value A"N of the acceleration AN that is applied when the user moves the portable magnetic disk apparatus 1 is lower than at the start of a fall as shown in FIGS. 6 and 7, and the second-order differential value A"N for acceleration does not go under the second-order differential threshold A"TH. Thus, the threshold setting component 304 leaves the acceleration threshold ATH set at A1, and does not change it to A2.

At the time T71, the acceleration AN goes under the acceleration threshold ATH that is A1 here, so the drop detector 305 determines that a falling state exists. However, the acceleration threshold ATH here remains at A1. Therefore, the acceleration AN goes over the acceleration threshold ATH at the time T72. Accordingly, the drop detector 305 determines that a falling state does not exist since the duration of the falling state is from the time T71 to the time T72, which is shorter than the drop time threshold Tdrop=100 ms. That is, the portable magnetic disk apparatus 1 can avoid mistakenly concluding that it is in a falling state even when a change in the movement acceleration that is similar to a falling state is detected due to movement by the user. Thus, this prevents the portable magnetic disk apparatus 1 from changing to its protected state, which would occur if a drop were mistakenly detected, and avoids causing the user any inconvenience.

Figure 9:
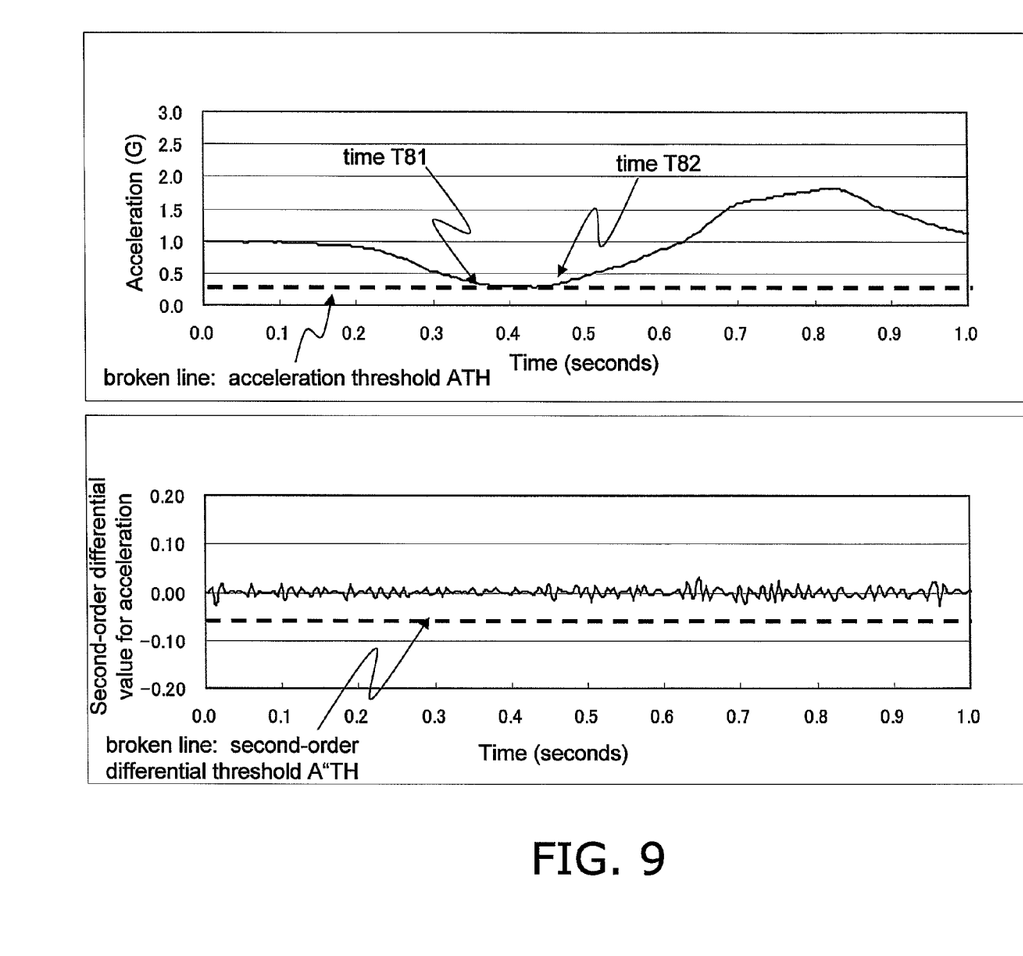
FIG. 9 consists of graphs of the acceleration, the second-order differential value for acceleration, and the thresholds when the user lowers the portable magnetic disk apparatus shown in FIG. 1.

Next, the drop detection when the portable magnetic disk apparatus 1 is pulled down by the user, as shown in FIG. 9, will be described.

The acceleration AN applied to the triaxial acceleration sensor 301a here will not be greater than 1 G because the portable magnetic disk apparatus 1 is descending spatially. Accordingly, the acceleration AN is 1 G or lower. However, the second-order differential value A"N of the acceleration AN applied when the user operates the portable magnetic disk apparatus 1 is lower than at the start of a fall as shown in FIGS. 6 and 7, and the second-order differential value A"N of the acceleration AN does not go under the threshold A"TH. Thus, the drop detector 305 leaves the acceleration threshold ATH set at A1, and does not change it from A1 to A2.

The acceleration AN goes under the acceleration threshold ATH that is A1 at the time T81. Thus, the drop detector 305 leaves the acceleration threshold ATH set at A1, and the acceleration AN goes over the acceleration threshold ATH at the time T82. The drop detector 305 then determines that a falling state does not exist. As a result, the drop detector 305 does not output a drop detection signal because the duration of the falling state is from the time T81 to the time T82, which is shorter than the drop time threshold Tdrop=100 ms. That is, with the portable magnetic disk apparatus 1 in this embodiment, mistaken detection of a falling state can be prevented by detecting the movement acceleration originating in movement by the user. Thus, this prevents the portable magnetic disk apparatus 1 from changing to its protected state, which would occur if a drop were mistakenly detected, and avoids causing the user any inconvenience.

Figure 10:
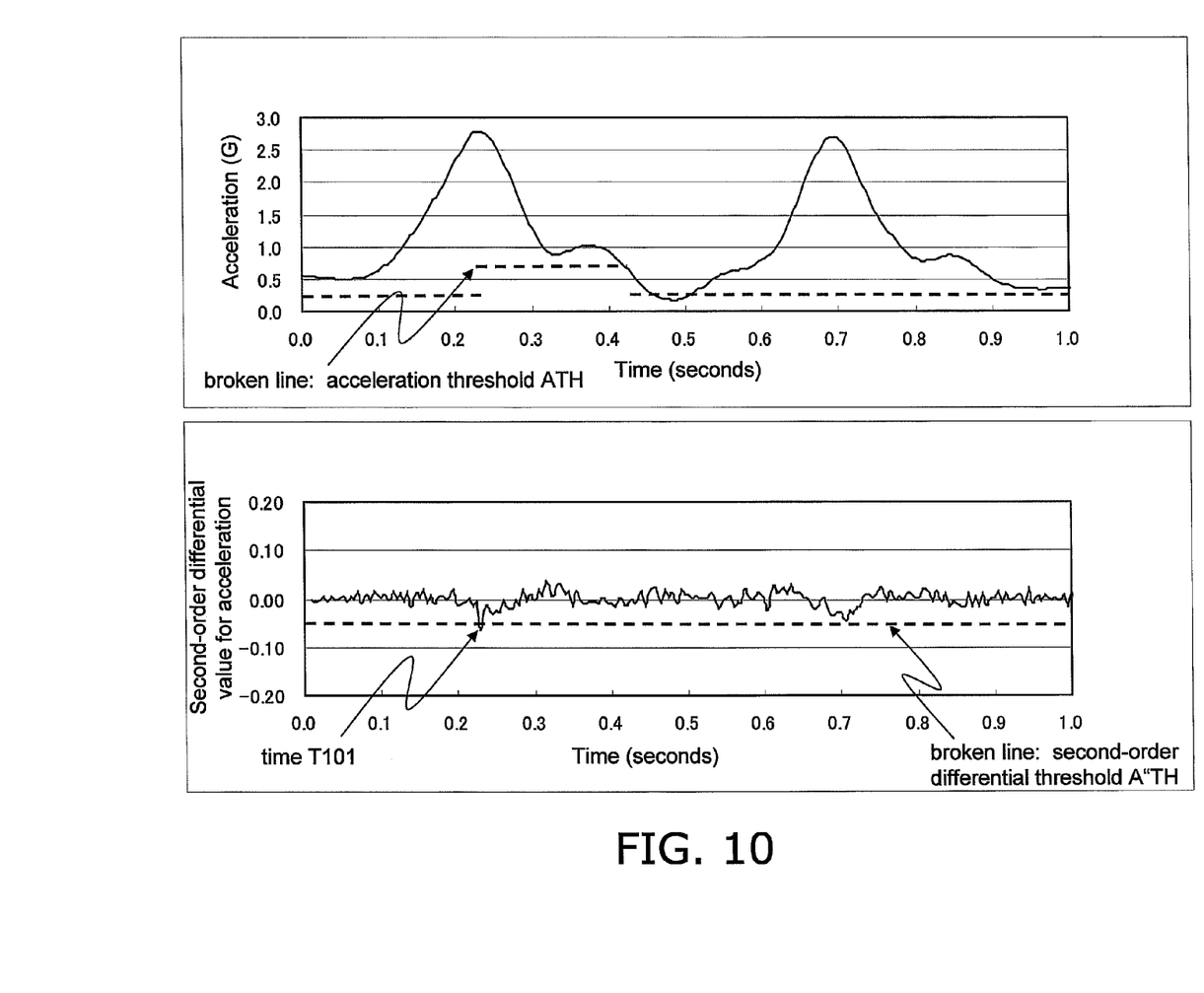
FIG. 10 consists of graphs of the acceleration, the second-order differential value for acceleration, and the thresholds when the user carries the portable magnetic disk apparatus shown in FIG. 1 while running.

As shown in FIG. 10, drop detection when the user is running while carrying the portable magnetic disk apparatus 1 will be described.

The portable magnetic disk apparatus 1 in this case repeatedly moves up and down spatially. Accordingly, the acceleration AN applied to the triaxial acceleration sensor 301a has a peak value of about 2.5 to 3.0 G, and repeatedly rises and falls between 0 and its peak value. Also, at the times when the acceleration AN is at the above-mentioned peak value, the second-order differential value A"N of the acceleration AN has a relatively large peak on the negative side, and goes under the second-order differential threshold A"TH. Therefore, the threshold setting component 304 changes the acceleration threshold ATH from A1 to A2 during the interval of the A2 duration Ta=200 ms (milliseconds) from the time T101. In this case, however, the acceleration AN does not go under the acceleration threshold ATH that is A2 here during the drop time threshold Tdrop=100 ms. Accordingly, the drop detector 305 does not determine that a falling state exists. Therefore, here again this prevents the portable magnetic disk apparatus 1 from changing to its protected state, which would occur if a drop were mistakenly detected, and avoids causing the user any inconvenience.

Features of Drop Detection Device 300

(1)

The drop detection device 300 in this embodiment, as shown in FIG. 2, comprises the acceleration detector 301 for detecting acceleration AN (ax, ay, and az), the calculator 302, the threshold setting component 304, and the drop detector 305. The calculator 302 calculates acceleration information including the second-order differential value A"N of the acceleration AN with respect to time detected by the acceleration detector 301. The threshold setting component 304 sets the acceleration threshold ATH with respect to the acceleration AN for determining whether or not a falling state exists, on the basis of the second-order differential value A"N of the acceleration component. The drop detector 305 detects that a falling state exists when the acceleration component reaches the acceleration threshold ATH set by the threshold setting component 304.

As a result, when the portable magnetic disk apparatus 1 is in a falling state, the threshold setting component 304 can set the acceleration threshold ATH with respect to the acceleration AN for detecting a falling state to the acceleration threshold A2, at which drop detection is more likely. This is because when an object falls from a stationary state, and the start of this fall the second-order differential value A"N of the acceleration AN changes sharply in the negative direction (has a large peak), and the threshold setting component 304 utilizes this to change the acceleration threshold ATH from A1 to A2. Therefore, the drop detector 305 can perform drop detection to high accuracy even when, for example, the portable magnetic disk apparatus 1 falls while rotating, that is, even when the acceleration AN is repeatedly increased and decreased under the influence of centrifugal force or the like during rotation, which was difficult to detect as a drop in the past.

Nor does mistaken detection occur even when acceleration is decreased by such a user's operation as raising or lowering the portable magnetic disk apparatus 1 (the drop detection device 300).

Thus, accurate drop detection can be performed even when drop detection is difficult, such as when the device falls while rotating. Also, mistaken detection caused by a change in movement acceleration that is accompanied by the user movement can be reduced. More reliable drop detection is therefore possible.

(2)

Figure 4:
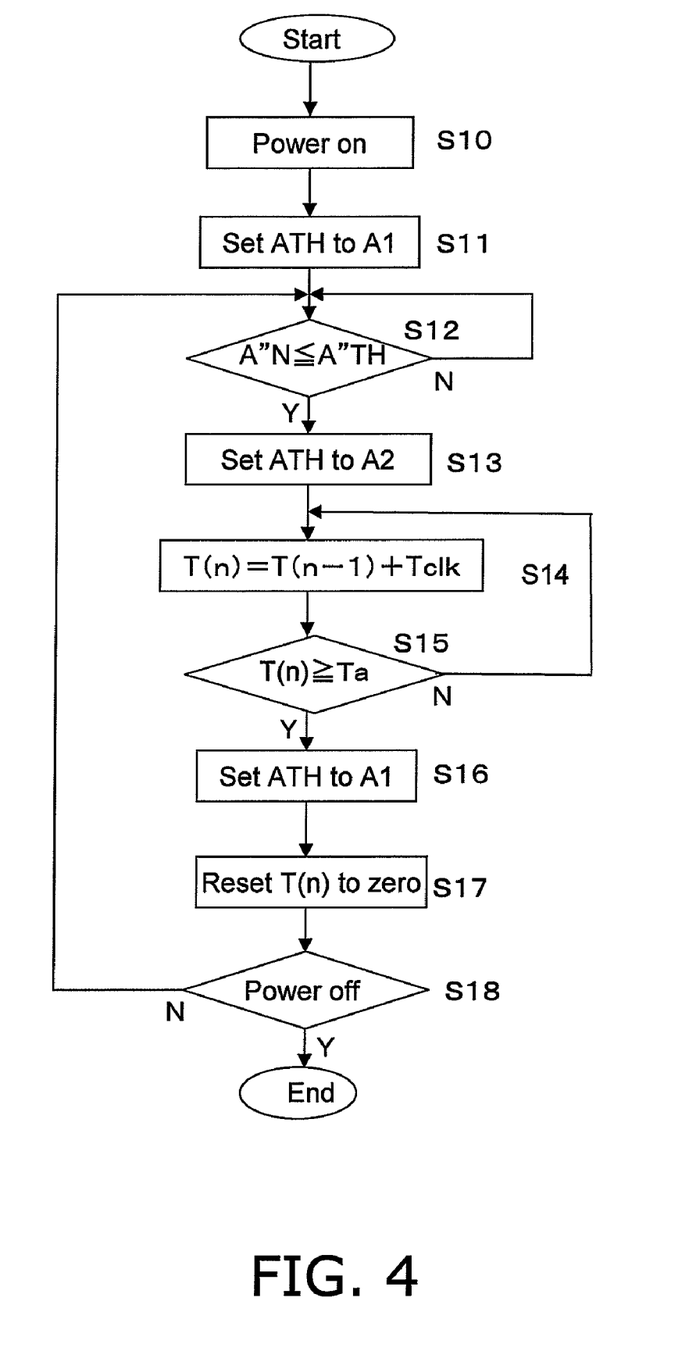
FIG. 4 is a flowchart of the processing operation of the threshold setting component shown in FIG. 2.

As shown in FIG. 4, the drop detection device 300 in this embodiment is such that the threshold setting component 304 changes the acceleration threshold ATH from A1 to A2 when the second-order differential value A"N reaches a specific second-order differential threshold A"TH.

Consequently, when the second-order differential value A"N of the acceleration AN reaches a specific threshold A"TH, the threshold setting component 304 can set the acceleration threshold ATH to A2, which is a value at which the drop detector 305 is more likely to detect a drop. Therefore, the criterion for changing the acceleration threshold ATH can be clearly determined.

As a result, the drop detection device 300 is able to execute stable drop detection by suitably setting a second-order differential threshold A"TH that is specific to the portable magnetic disk apparatus 1 in advance.

(3)

Figure 5:
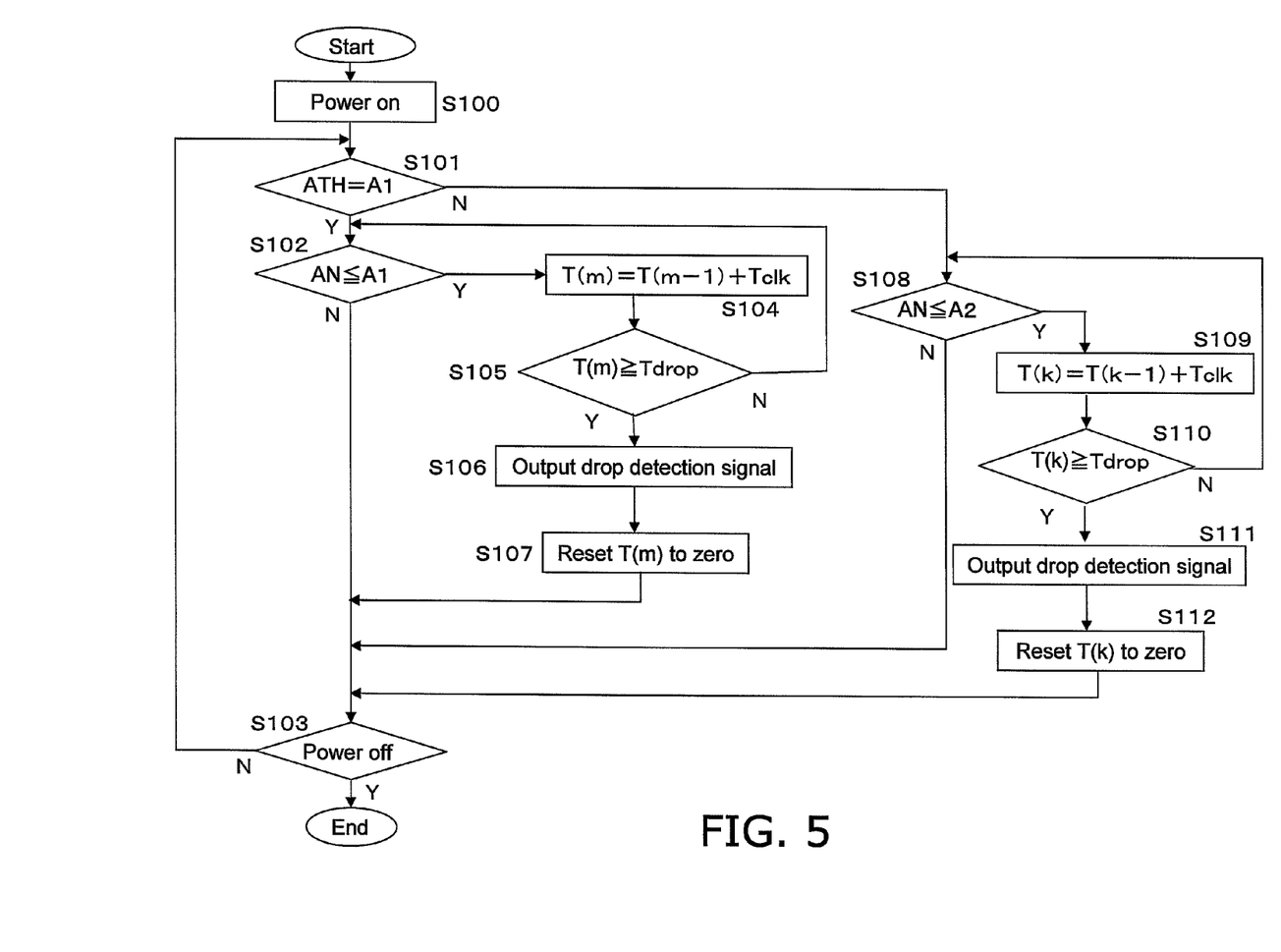
FIG. 5 is a flowchart of the processing operation of the drop detection device shown in FIG. 2.

As shown in FIG. 5, the drop detection device 300 in this embodiment is such that the drop detector 305 detects a falling state when the drop time threshold Tdrop has elapsed in a state in which the acceleration AN has reached the acceleration threshold ATH.

Consequently, as shown in FIGS. 8, 9, and 10, even when the acceleration AN temporarily reaches the acceleration threshold ATH (A1 or A2), the drop detector 305 will not output a drop detection signal as long as this state has not continued for at least the drop time threshold Tdrop. Here, if the above-mentioned second-order differential value for acceleration has reached the above-mentioned second-order differential threshold, as shown in FIGS. 6 and 7, since the acceleration threshold ATH is set to A2, which is a value at which drop detection is more likely, the time T(k) during which the acceleration AN has reached the acceleration threshold ATH tends to continue. However, if the second-order differential value A"N has not reached the second-order differential threshold A"TH, the acceleration threshold ATH is set to A1, which is a value at which drop detection is less likely to occur. Accordingly, the time T(m) during which the acceleration AN has reached the acceleration threshold ATH is shorter. Also, as shown in FIG. 10, even if the second-order differential value A"N drops under the second order differential threshold A"TH due to up and down motion when the user is running, that is, even if the acceleration threshold ATH is changed from A1 to A2, mistaken detection of a drop can be prevented by providing the drop time threshold Tdrop.

As a result, even if the acceleration AN of the drop detection device 300 temporarily reaches the acceleration threshold ATH due to user actions such as the raising or lowering of the drop detection device 300 (or the portable magnetic disk apparatus 1), mistaken detection of a drop can be reliably prevented.

(4)

As shown in FIG. 4, the drop detection device 300 in this embodiment is such that the threshold setting component 304 changes the acceleration threshold ATH from A1 to A2 on the basis of the second-order differential value A"N of the acceleration AN, then the setting goes from A2 back to A1 after the A2 duration Ta (the specific second time) has elapsed from when this change was made.

The result of this is that the acceleration threshold A2 at which a falling state is more likely to be detected, that is, A2 whose value is closer to 1 G than A1, can be used as the threshold for detecting a drop only during the A2 duration Ta after the second-order differential value A"N of the acceleration AN has reached the specific threshold A"TH. If the acceleration threshold ATH remains set to A2, or if there is no change to A1 until the user performs a specific operation, there is the risk that the acceleration AN will reach A2 with respect to spatial movement that is not a drop, and that this will lead to erroneous detection of a drop.

Therefore, the portable magnetic disk apparatus 1 (the drop detection device 300) can be provided with which, by limiting the time during which the acceleration threshold ATH with respect to the acceleration AN for drop detection is set to A2, it is possible to reliably detect a drop in the case of a falling state, without detecting a drop in the case of up or down motion, etc., caused by the action of the user.

As a result, the drop detection device 300 properly detects a falling state, and mistaken drop detection can be prevented. Therefore, the apparatus can be prevented from having any trouble in use caused by mistaken drop detection.

(5)

As shown in FIG. 5, the drop detection device 300 in this embodiment has a triaxial acceleration sensor 301a for detecting the acceleration (ax, ay, and az) in each of three mutually intersecting directions.

The result of this is that no matter which direction the acceleration AN is produced in the portable magnetic disk apparatus 1, this acceleration AN can be detected as a combination of the output of the acceleration sensor for the three axial directions (ax, ay, and az).

As a result, the calculator 302 can calculate the acceleration AN that accurately matches the acceleration actually produced in the drop detector 305, regardless of the falling state.

(6)

As shown in FIG. 1, the portable magnetic disk apparatus 1 in this embodiment comprises the drop detection device 300 and the controller 105, which performs anti-impact processing when the drop detection device 300 outputs a drop detection signal.

The result is that if the user should accidentally drop the portable magnetic disk apparatus 1, the portable magnetic disk apparatus 1 can execute processing to retract the magnetic head 102 into the ramp load component 104 and protect itself from impact, before hitting the floor or ground.

As a result, damage or malfunction caused by collision between the magnetic disk 101 and the magnetic head 102 due to impact upon falling can be prevented.

(7)

As shown in FIG. 1, the portable magnetic disk apparatus 1 in this embodiment comprises the magnetic head 102 for recording to and reproducing from the magnetic disk 101, and the controller 105 for moving the magnetic head 102 to the ramp load component 104 when a drop is detected.

The result is that when the drop detection device 300 detects a drop and outputs a drop detection signal, the controller 105 receives this drop detection signal and can retract the magnetic head 102 into the ramp load component 104. Therefore, if the portable magnetic disk apparatus 1 should be dropped onto the ground, etc., and suffer an impact, the magnetic head 102 and the magnetic disk 101 can be prevented from colliding inside the device.

As a result, damage to the magnetic disk 101 or magnetic head 102, or to the information recorded on the magnetic disk 101, is avoided, and the device can be protected.

OTHER EMBODIMENTS

An embodiment of the present invention was described above, but the present invention is not limited to this embodiment, and various modifications are possible without departing from the gist of the invention.

(A)

In the above embodiment, an example was described in which the drop detection device 300 was installed in the portable magnetic disk apparatus 1, but the present invention is not limited to this.

For example, it may be a magnetic disk recording and reproducing device or other such non-portable apparatus.

Here again, if a carrier should accidentally drop a non-portable apparatus during its shipment, the drop detection device 300 can output a signal for protecting whatever part of the device that needs to be protected against impact.

(B)

In the above embodiment, an example was described in which the portable magnetic disk apparatus 1 was used as an portable apparatus, but the present invention is not limited to this.

For example, the drop detection device of the present invention may instead be installed in a portable telephone, a portable information terminal (PDA), a digital camera, or another such portable apparatus.

(C)

In the above embodiment, the drop time threshold Tdrop was given as 100 ms and the A2 duration Ta as 200 ms, but the present invention is not limited to this.

For example, the drop time threshold Tdrop may be set to less than 100 ms, or to a time that is longer than 100 ms. Similarly, the A2 duration Ta may be set to less than 200 ms, or to a time that is longer than 200 ms.

(D)

In the above embodiment, an example was described in which the acceleration detector 301 had a piezo element, but the present invention is not limited to this.

For example, the acceleration sensor that is installed may instead be an electrostatic capacitance or thermosensing type of acceleration sensor.

(E)

In the above embodiment, an example was described in which the controller 105 (protector) retracted the magnetic head 102 into the ramp load component 104 (retraction component), but the present invention is not limited to this.

For example, there may be a function or configuration with which the magnetic head 102 will not come into contact (collide) with the magnetic disk 101 even if subjected to impact from being dropped.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drop detection device, comprising:
   an acceleration detector configured to detect movement acceleration;
   a calculator configured to calculate acceleration information including an acceleration component of the movement acceleration detected by the acceleration detector, and a second-order differential value of the acceleration component with respect to time;
   a threshold setting component configured to set an acceleration threshold with respect to the acceleration component for determining whether or not a falling state exists, on the basis of the second-order differential value of the acceleration component; and
   a drop detector configured to detect that a falling state exists when the acceleration component reaches the acceleration threshold set by the threshold setting component.

2. The drop detection device according to claim 1,
   wherein the threshold setting component changes the acceleration threshold when the second-order differential value reaches a specific second-order differential threshold.

3. The drop detection device according to claim 1,
   wherein the drop detector detects that a falling state exists when a specific first time has been exceeded in a state in which the acceleration component has reached the acceleration threshold.

4. The drop detection device according to claim 1,
   wherein, after a specific second time from when the acceleration threshold is set on the basis of the second-order differential value, the threshold setting component sets the acceleration threshold back to the acceleration threshold prior to the setting.

5. The drop detection device according to claim 1,
   wherein the acceleration detector has a triaxial acceleration sensor that detects the movement acceleration in each of three mutually intersecting axial directions.

6. An portable apparatus, comprising:
   the drop detection device according to claim 1; and
   a protector for implementing anti-impact measures when the drop detection device detects a drop.

7. The portable apparatus according to claim 6, further comprising:
   a magnetic head for recording to and reproducing from a magnetic recording disk; and
   a controller for retracting the magnetic head into a retraction region.

8. The drop detection device according to claim 2, wherein the drop detector detects that a falling state exists when a specific first time has been exceeded in a state in which the acceleration component has reached the acceleration threshold.

9. The drop detection device according to claim 2, wherein, after a specific second time from when the acceleration threshold is set on the basis of the second-order differential value, the threshold setting component sets the acceleration threshold back to the acceleration threshold prior to the setting.

10. The drop detection device according to claim 2, wherein the acceleration detector has a triaxial acceleration sensor that detects the movement acceleration in each of three mutually intersecting axial directions.

11. An portable apparatus, comprising:
the drop detection device according to claim 2; and
a protector for implementing anti-impact measures when the drop detection device detects a drop.

12. The portable apparatus according to claim 11, further comprising:
a magnetic head for recording to and reproducing from a magnetic recording disk; and
a controller for retracting the magnetic head into a retraction region.

13. The drop detection device according to claim 3, wherein, after a specific second time from when the acceleration threshold is set on the basis of the second-order differential value, the threshold setting component sets the acceleration threshold back to the acceleration threshold prior to the setting.

14. The drop detection device according to claim 3, wherein the acceleration detector has a triaxial acceleration sensor that detects the movement acceleration in each of three mutually intersecting axial directions.

15. An portable apparatus, comprising:
the drop detection device according to claim 3; and
a protector for implementing anti-impact measures when the drop detection device detects a drop.

16. The portable apparatus according to claim 15, further comprising:
a magnetic head for recording to and reproducing from a magnetic recording disk; and
a controller for retracting the magnetic head into a retraction region.

17. The drop detection device according to claim 4, wherein the acceleration detector has a triaxial acceleration sensor that detects the movement acceleration in each of three mutually intersecting axial directions.

18. An portable apparatus, comprising:
the drop detection device according to claim 4; and
a protector for implementing anti-impact measures when the drop detection device detects a drop.

19. The portable apparatus according to claim 18, further comprising:
a magnetic head for recording to and reproducing from a magnetic recording disk; and
a controller for retracting the magnetic head into a retraction region.

20. An portable apparatus, comprising:
the drop detection device according to claim 5; and
a protector for implementing anti-impact measures when the drop detection device detects a drop.

* * * * *